(12) United States Patent
Lin

(10) Patent No.: US 9,477,028 B2
(45) Date of Patent: Oct. 25, 2016

(54) BACK LIGHT MODULE

(71) Applicant: HON HAI PRECISION INDUSTRY CO., LTD., New Taipei (TW)

(72) Inventor: Chen-Han Lin, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 67 days.

(21) Appl. No.: 14/543,510

(22) Filed: Nov. 17, 2014

(65) Prior Publication Data
US 2016/0070045 A1 Mar. 10, 2016

(30) Foreign Application Priority Data

Sep. 9, 2014 (TW) .............................. 103130970 A

(51) Int. Cl.
F21V 8/00 (2006.01)
F21V 5/02 (2006.01)
F21V 7/04 (2006.01)
F21V 7/00 (2006.01)

(52) U.S. Cl.
CPC ............. *G02B 6/003* (2013.01); *G02B 6/0028* (2013.01); *G02B 6/0073* (2013.01); *F21V 5/02* (2013.01); *F21V 7/0083* (2013.01); *F21V 7/0091* (2013.01)

(58) Field of Classification Search
CPC .. G02B 6/003; G02B 6/0028; G02B 6/0073; F21V 7/0091; F21V 5/005; F21V 5/007; F21V 7/0083
USPC .......................................................... 362/626
See application file for complete search history.

(56) References Cited

U.S. PATENT DOCUMENTS

| 6,474,826 B1* | 11/2002 | Tanaka ................. G02B 6/0018 362/23.16 |
| 7,160,003 B2* | 1/2007 | Saitoh .................. G02B 6/0038 362/330 |
| 7,690,810 B2* | 4/2010 | Saitoh .................... G02B 5/045 362/244 |
| 8,068,194 B2* | 11/2011 | Itoh ....................... G02B 6/0023 349/62 |
| 2008/0186273 A1* | 8/2008 | Krijn .................... G02B 6/0021 345/102 |

* cited by examiner

Primary Examiner — Alan Cariaso
(74) Attorney, Agent, or Firm — Zhigang Ma

(57) ABSTRACT

A back light module includes a lens and a plurality of LED elements. The lens includes a light incident surface and a light extraction surface, a plurality of first recesses being defined in the light extraction surface, a plurality of second recesses being defined in the light incident surface. Each first recess has a pair of first inclined surfaces, and an angle between the first inclined surface and a plane where the light incident surface located is larger than or equal to a critical angle of total reflection of the lens. Each second recess has a pair of second inclined surfaces, and an angle between the second inclined surface and the plane where the light incident surface located is less than or equal to the angle between the first inclined surface and the plane where the light incident surface located.

7 Claims, 5 Drawing Sheets

BACK LIGHT MODULE

CROSS-REFERENCE TO RELATED APPLICATIONS

This application claims priority to Taiwan Patent Application No. 103130970 filed on Sep. 9, 2014, the contents of which are incorporated by reference herein.

FIELD

The disclosure relates to a back light module, and particularly to a back light module with a thin lens.

BACKGROUND

A thick lens increases a light mixed distance, which requires a large size of back light module to be large in size.

BRIEF DESCRIPTION OF THE DRAWINGS

Implementations of the present technology will now be described, by way of example only, with reference to the attached figures.

DETAILED DESCRIPTION OF EMBODIMENTS

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Figure 1:
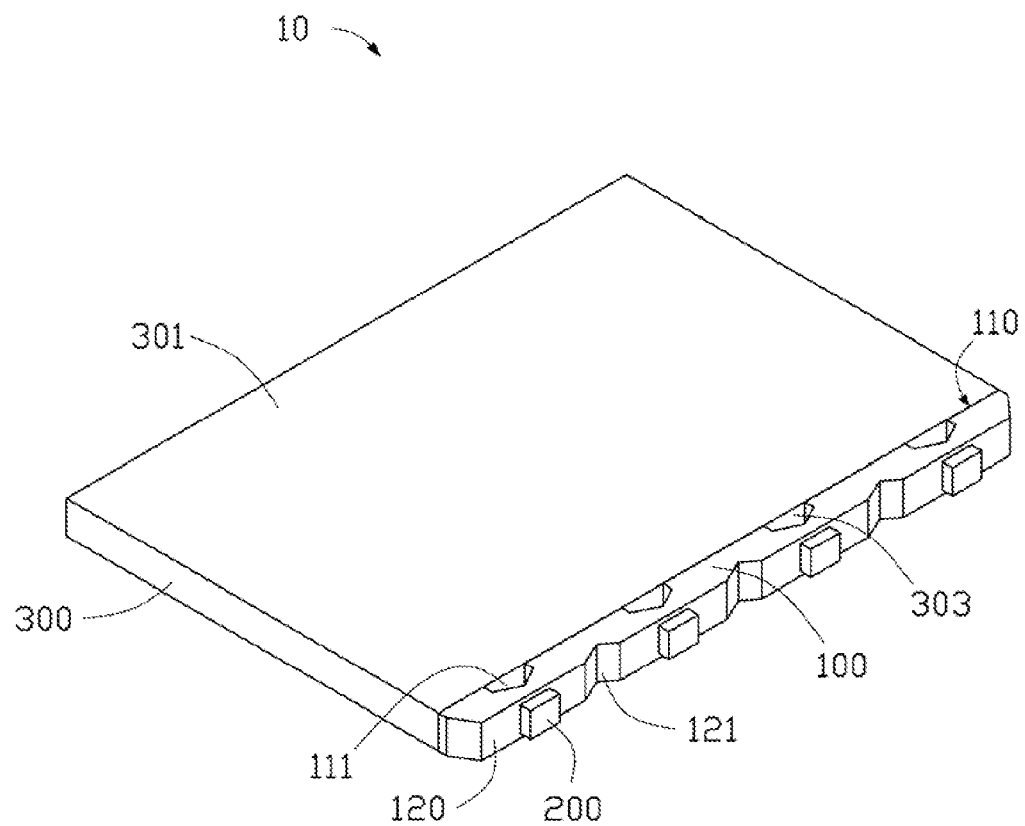
FIG. 1 is an isometric view of a back light module in accordance with a first exemplary embodiment of the present disclosure.
Figure 2:
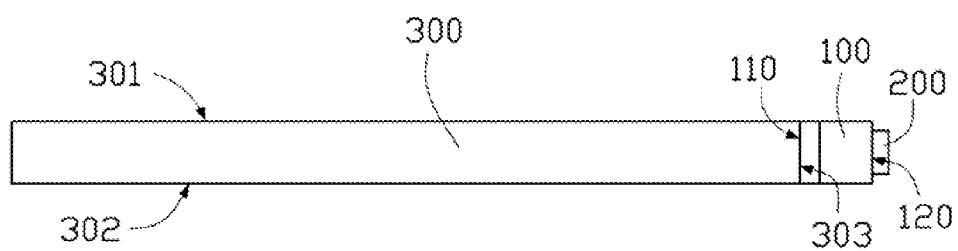
FIG. 2 is a side view of the back light module shown in FIG. 1.
Figure 3:
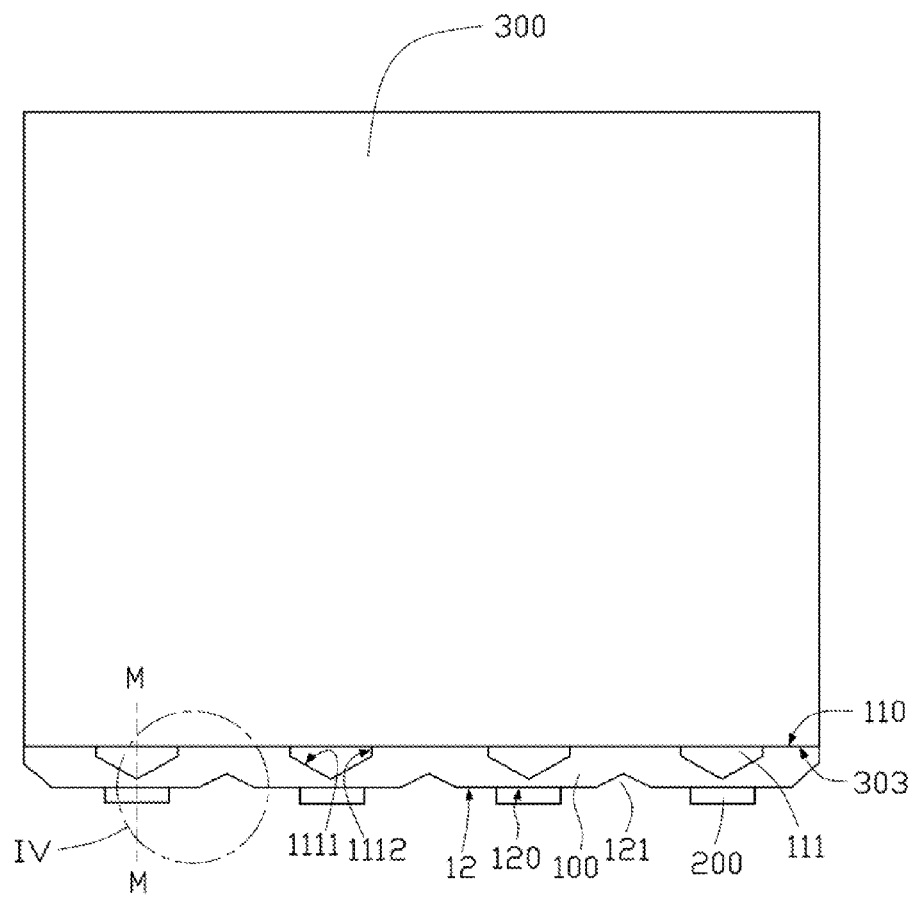
FIG. 3 is a top plan view of the back light module shown in FIG. 2.

Referring to FIGS. 1-3, a back light module 10 comprises a lens 100 and a plurality of light emitting diode (LED) elements 200. The lens 100 comprises a light extraction surface 110 and a light incident surface 120. The LED elements 200 are arranged on the light incident surface 120. Light is emitted from the LED elements 200 and penetrates the lens 100 from the light incident surface 120. The light then travels out of the lens 100 from the light extraction surface 110.

Figure 4:
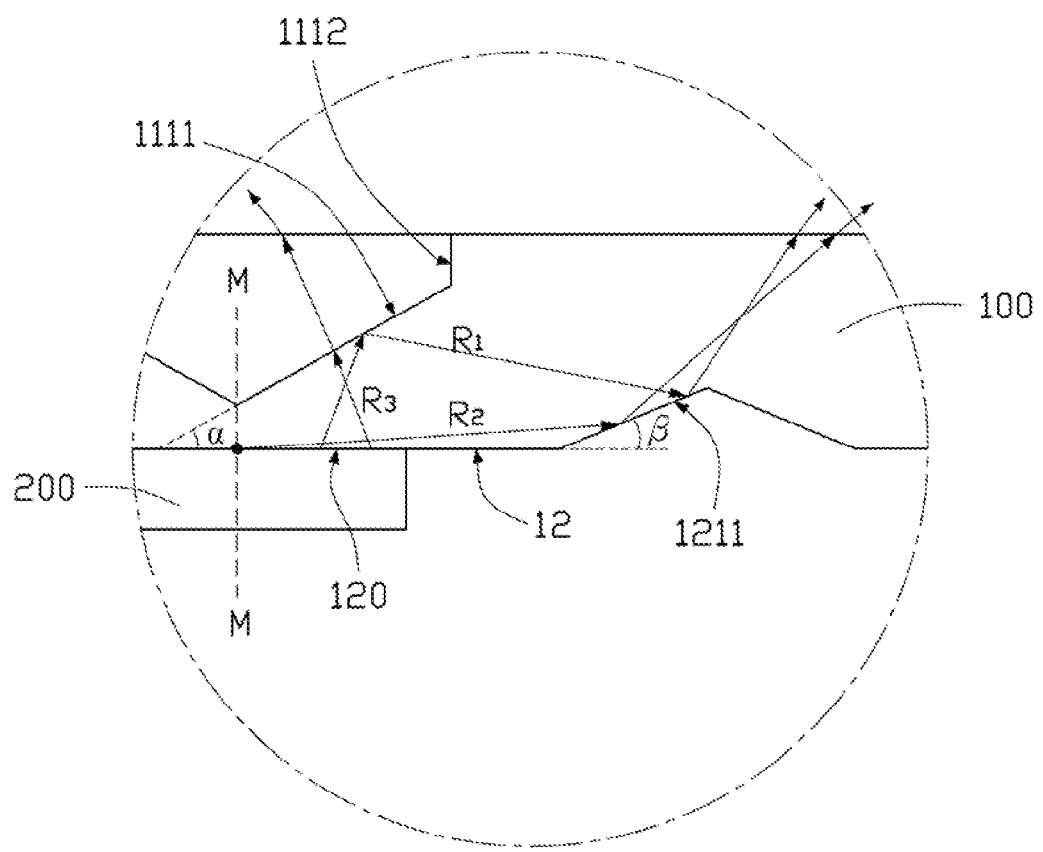
FIG. 4 is an enlarged view of circled portion IV of FIG. 3.

A plurality of first recesses 111 are defined in the light extraction surface 110. Each first recess 111 is positioned corresponding to an LED element 200. Each first recess 111 is symmetric about an optic axis M-M of the corresponding LED element 200. In at least one embodiment, each first recess 111 is substantially V-shaped. A pair of first inclined surfaces 1111 and a pair of connecting surfaces 1112 are defined in the first recess 111. One connecting surface 1112 is connected between one first inclined surface 1111 and the light extraction surface 110. The pair of first inclined surfaces 1111 intersect at the optic axis M-M of the corresponding LED element 200. The connecting surfaces 1112 can be perpendicular to the first light extraction surface 110. An angle α between the first inclined surface 1111 and a plane 12 where the light incident surface 120 is located is larger than or equal to a critical angle θ of total reflection of the lens, which is α≥θ. Referring to FIG. 4, an incident angle of light $R_1$ at the first inclined surface 1111 is larger than or equal to the critical angle θ, and light $R_1$ is totally reflected by the first inclined surface 1111. An incident angle of light $R_3$ at the first inclined surface 1111 is less than the critical angle θ, and light $R_3$ is refracted on the first inclined surface 1111 and travels out of the lens 100 from the first inclined surface 1111.

A plurality of second recesses 121 are defined on the light incident surface 120. Each second recess 121 is located between each two adjacent LED elements 200. Each second recess 121 is V-shaped. A pair of second inclined surfaces 1211 are defined in each second recess 121. An angle β between the second inclined surface 1211 and the plane 12 where the light incident surface 120 located is less than or equal to the angle α between the first inclined surface 1111 and the plane 12 where the light incident surface 120 located, which is β≤α. Referring to FIG. 4, light $R_1$ that is totally reflected by the first inclined surface 1111 is totally reflected by the second inclined surface 1211.

Furthermore, the angle β between the second inclined surface 1211 and the plane 12 where the light incident surface 120 located can be less than or equal to the critical angle θ of total reflection of the lens 100, which is β≤θ.

Moreover, the angle β between the second inclined surface 1211 and the plane 12 where the light incident surface 120 located can be less than or equal to a complementary angle of the critical angle θ of total reflection of the lens 100, which is β≤90°−θ.

Figure 5:
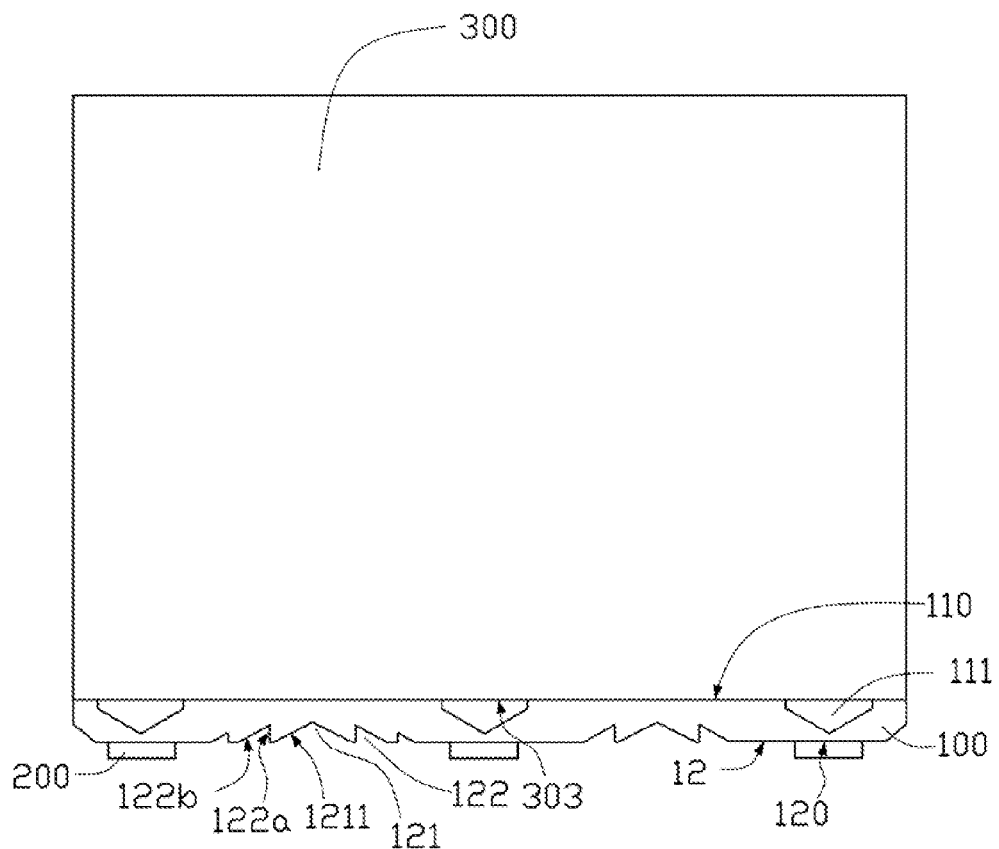
FIG. 5 is a top plan view of a back light module in accordance with a second exemplary embodiment of the present disclosure.

Referring to FIG. 5, in an alternative exemplary embodiment, a plurality of third recesses 122 are defined in the light inclined surface 120. The third recesses 122 are located at two lateral sides of the second recess 121, and are spaced from the second recess 121. According to FIG. 5, two third recesses 122 are defined at each lateral side of the second recess 121 located at the left side of the lens 100. One third recess 122 is defined at each lateral side of the second recess 121 located at the right side of the lens 100.

Each third recess 122 comprises a first flank 122a and a second flank 122b. The first flank 122a is near the second recesses 121, and the second flank 122b is far away from the second recess 121 compared to the corresponding first flank 122a of the third recess 122. An angle between the second flank 122b and the plane 12 where the light incident surface 120 located is less than the angle β between the second inclined surface 121 and the plane 12 where the light incident surface 120 located.

Furthermore, angles between the second flanks 122b of the third recesses 122 located between two adjacent LED elements 200 and the plane 12 where the light incident surface 120 is located can reduce in sequence from the second recess 121 to the LED elements 200.

Moreover, depths of the third recesses 122 can be less than a depth of the second recess 121. The depths of the third recesses 122 located between two adjacent LED elements 200 can reduce in sequence from the second recess 121 to the LED elements 200. In this embodiment, the first flank 122a can be perpendicular to the plane 12 where the light incident surface 120 located. In other embodiments, angles between the first flanks 122a and the plane 12 where the light incident surface 120 located can be less than 90°.

The back light module of the present disclosure also comprises a light guide plate 300. The light guide plate 300 is formed on the light extraction surface 110. Light can travel out of the lens 100 from the light extraction surface 110 and then penetrate the light guide plate 300.

The light guide plate 300 comprises a first surface 301, a second surface 302 and a third surface 303. The first surface 301 is opposite to the second surface 302. The first surface 301 can be parallel to the second surface 302. The third surface 303 is connected between the first surface 301 and the second surface 302. The light extraction surface 110 of the lens 100 is coupled to the third surface 303 of the light guide plate 300. The light extracting from the light extraction surface 110 of the lens 100 enters the light guide plate 300 from the third surface 303, and may be extracted out of the light guide plate 300 from the first surface 301.

The embodiments shown and described above are only examples. Many details are often found in the art such as the other features of a back light module. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A back light module comprising:
   a lens comprising a light extraction surface defining a plurality of first recesses and a light incident surface defining a plurality of second recesses;
   each of the plurality of first recesses having a pair of first inclined surfaces, and an angle between the first inclined surface and a plane where the light incident surface is located being larger than or equal to a critical angle of total reflection of the lens;
   each of the plurality of second recesses having a pair of second inclined surfaces, and an angle between the second inclined surface and the plane where the light incident surface is located being less than or equal to the angle between the first inclined surface and the plane where the light incident surface is located; and
   a plurality of light emitting diode (LED) elements configured to emit light that penetrates the lens from the light incident surface and travels out of the lens from the light extraction surface, each LED element corresponding to one first recess, which is symmetric about the optic axis of the corresponding LED element, and each second recess being located between two adjacent LED elements;
   wherein a plurality of third recesses are further defined in the light incident surface and located at lateral sides of the second recesses, each third recess comprises a first flank and a second flank, an angle between the second flank and the plane where the light incident surface is located is less than the angle between the second inclined surface and the plane where the light incident surface located, and the first flank is closer to the second recess than the second flank of the each third recess.

2. The back light module of claim 1, wherein the angle between the second inclined surface and the plane where the light incident surface is located is less than or equal to the critical angle of total reflection of the lens.

3. The back light module of claim 1, wherein the angle between the second inclined surface and the plane where the light incident surface is located is less than or equal to a complementary angle of the critical angle of total reflection of the lens.

4. The back light module of claim 1, wherein angles between the second flanks of the third recesses between two adjacent LED elements and the plane where the light incident surface is located reduce in sequence from the second recess to anyone of the two adjacent LED elements.

5. The back light module of claim 1, wherein depths of the third recesses are less than a depth of the second recess.

6. The back light module of claim 5, wherein the depths of the third recesses between two adjacent LED elements reduce in sequence from the second recess to any one of the two adjacent LED elements.

7. The back light module of claim 1 further comprises a light guide plate coupled to the lens, and light travels out of the lens from the light extraction surface and then penetrate the light guide plate.

* * * * *